(12) United States Patent
Linaker

(10) Patent No.: US 8,554,250 B2
(45) Date of Patent: Oct. 8, 2013

(54) REMOTE OBJECT RECOGNITION

(75) Inventor: Fredrik Linaker, Antibes (FR)

(73) Assignee: Accenture Global Services Limited, Dublin (IE)

( * ) Notice: Subject to any disclaimer, the term of this patent is extended or adjusted under 35 U.S.C. 154(b) by 795 days.

(21) Appl. No.: 12/528,720

(22) PCT Filed: Feb. 26, 2008

(86) PCT No.: PCT/EP2008/052306
§ 371 (c)(1),
(2), (4) Date: Oct. 12, 2009

(87) PCT Pub. No.: WO2008/104537
PCT Pub. Date: Sep. 4, 2008

(65) Prior Publication Data
US 2010/0103241 A1  Apr. 29, 2010

(30) Foreign Application Priority Data
Feb. 27, 2007  (EP) .................................. 07300827

(51) Int. Cl.
*H04W 24/00* (2009.01)
(52) U.S. Cl.
USPC ......................... 455/456.6; 345/173
(58) Field of Classification Search
USPC ....................... 345/173; 455/456.6
See application file for complete search history.

(56) References Cited

U.S. PATENT DOCUMENTS

| 7,661,071 | B2 * | 2/2010 | Blanco .......................... 715/782 |
| 2003/0164819 | A1 * | 9/2003 | Waibel ........................... 345/173 |
| 2006/0287083 | A1 | 12/2006 | Ofek |
| 2008/0170118 | A1 * | 7/2008 | Albertson et al. ............... 348/46 |
| 2008/0288165 | A1 * | 11/2008 | Suomela et al. ............... 701/201 |
| 2009/0231441 | A1 * | 9/2009 | Walker et al. ............... 348/207.1 |
| 2012/0092304 | A1 * | 4/2012 | Katz ........................... 345/179 |

FOREIGN PATENT DOCUMENTS

| EP | 1710717 A1 | 10/2006 |
| JP | 2002-108873 | 4/2002 |
| JP | 2002-149302 | 5/2002 |
| JP | 2003-111128 | 4/2003 |

OTHER PUBLICATIONS

"Object Recognition with Mobile Phones", Germann, M., Internet Citation (Online) 2005, XP002394173, Retrieved from the internet: URL: http://www.masi.li/own/ethprojects/st2/report.pdf> [retrieved on Aug. 9, 2006.
"Camera Phone Based Motion Sensing: Interaction Techniques, Applications and Performance Study", J. Wang, et al., Proceedings of the 19th Annual ACM Symposium on User Interface Software and Technology, UIST '06 (Session 3: Sensing from Head to Toe), Oct. 15, 2006-Oct. 18, 2006, XP002448745, Montreaux, Switzerland.
International Search Report issued in PCT/EP2008/052306 issued on May 27, 2008.

* cited by examiner

*Primary Examiner* — Alexander Jamal
(74) *Attorney, Agent, or Firm* — Mannava & Kang, P.C.

(57) ABSTRACT

The invention concerns a method of accessing information using a wireless mobile device (1) having a display (3), and video capturing unit, the method comprising: establishing a video call with a remote server (6) such that said remote server receives video images captured by said mobile device during the video call; performing image recognition to identify at least one first object (4) in said captured video; and generating a signal for transmission to said mobile device, said signal comprising information relating to said first object.

28 Claims, 4 Drawing Sheets

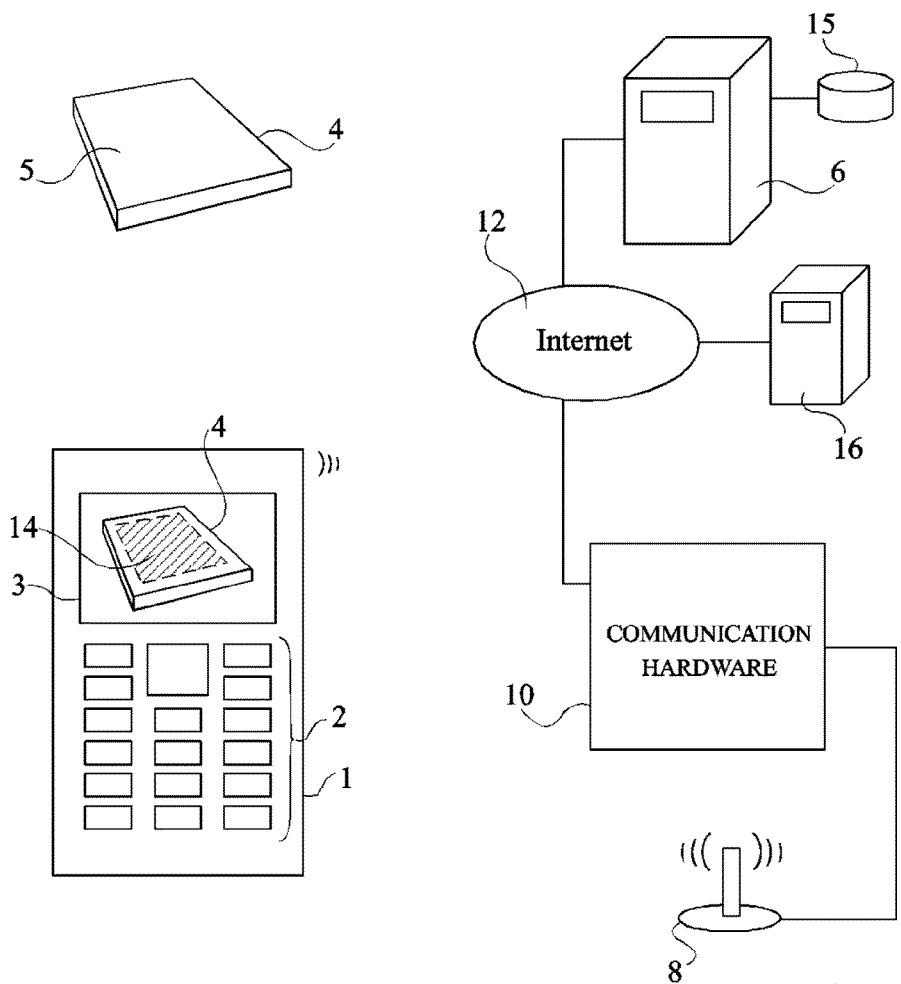
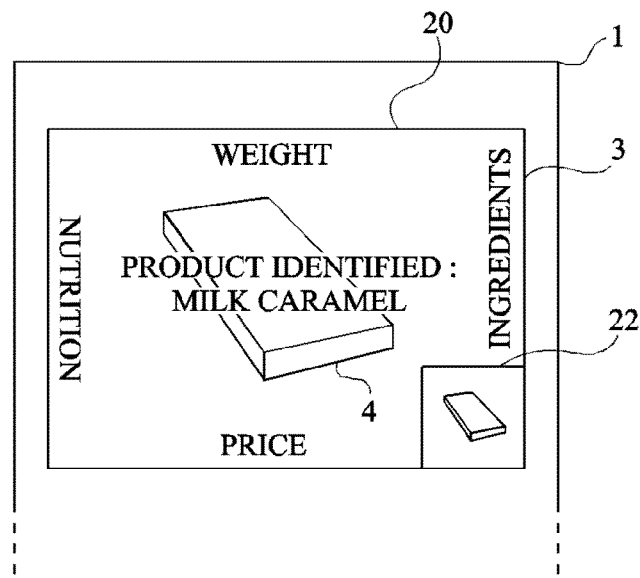

REMOTE OBJECT RECOGNITION

FIELD OF THE INVENTION

The present invention relates to a system and method for remotely accessing data, and in particular to a system and method for retrieving data via a handheld mobile device.

BACKGROUND OF THE INVENTION

More and more information is freely available from data sources such as the Internet. For example, an abundance of data is available relating to products, such as books, CDs, DVDs and video games. Additionally, data entry methods are becoming more advanced, making it is easier to compile databases.

A problem occurs when individuals wish to access such data in everyday life. To take one example, upon entering a book shop, if a customer finds a book that is of interest, the customer may wish to know whether the price is competitive. There are numerous sites on the Internet that quote competitive book prices allowing prices to be compared, which would be of great use to that customer in this instance. Furthermore, the Internet can also provide further information, such as book reviews, and lists of alternative books on the same subject. However, accessing this data when it is needed can be difficult.

Mobile telephones provide one option to such a customer for accessing the Internet from any location, such as from the book store. Modern mobile phones, using technology such as WAP (wireless application protocol) are able to some give limited internet access, while new network standards such as 3G (third generation) improve connection speeds. However, there is a technical problem when trying to retrieve the required information in this manner, due to the large amounts of data involved, and the relatively small device having only a small human input interface and a small display. Thus in practice, using a mobile phone with Internet access according to known methods is an unsatisfactory solution to this problem.

SUMMARY OF THE INVENTION

It is an aim of the present invention to provide an improved method of accessing information via a hand-held mobile communications device.

According to a first aspect of the present invention, there is provided a method of accessing information using a wireless mobile device having a display, and video capturing unit, the method comprising: establishing a video call with a remote server such that said remote server receives video images captured by said mobile device during the video call; performing image recognition to identify at least one first object in said captured video; and generating a signal for transmission to said mobile device, said signal comprising information relating to said first object.

According to a further aspect of the present invention, there is provided a method of using of a wireless mobile device for accessing information relating to an object, wherein said mobile device comprises a video capturing unit, the use comprising: using said mobile device to establish a video call between the mobile device and a remote server; pointing said video capturing unit at the object; and moving the video capturing unit such that the object changes position in the field of view of the video capturing unit to select, based on the direction of the movement, specific information relating to the object.

According to a further aspect of the present invention, there is provided a system for accessing information comprising: a wireless mobile device comprising a video capturing unit arranged to capture video images; and a server capable of communicating with said mobile device in a video call, said server comprising: an image recognition unit arranged to identify an object in one or more of said video images; and a transmission unit arranged to transmit a signal to said mobile device comprising object information relating to said object.

According to a further aspect of the present invention, there is provided an automatic information supply system comprising: a video calling unit arranged to communicate with a wireless mobile device in a video call and to receive video images captured by said mobile device; an image recognition unit arranged to identify an object in one or more of said video images; a motion detection unit arranged to detect a motion of an object in said video images; and a transmission unit arranged to transmit a signal to said mobile device comprising object information relating to said object.

According to a further aspect of the present invention, there is provided a method of building a 3D object map using a wireless mobile device having a display, and video capturing unit, the method comprising: establishing a video call with a remote server such that said remote server receives video images captured by said mobile device during the video call; performing image recognition to identify a plurality of objects in said captured video images; performing motion detection of said detected objects; and generating, and storing in a memory said 3D object map based on said identified objects.

According to a further aspect of the present invention, there is provided a method of using of a wireless mobile device comprising a video capturing unit for generating a 3D object map comprising: establishing a video call with a remote server, said remote server receiving video images captured by said mobile device; pointing said mobile device at a series of objects to capture said objects in said video call; and receiving a 3D object map of said objects from said remote server.

According to a further aspect of the present invention, there is provided a server for generating a 3D object map comprising: a video calling unit arranged to communicate with a wireless mobile device in a video call and to receive video images captured by said mobile device; an image recognition unit arranged to identify an object in one or more of said video images; a motion detection unit arranged to detect a motion of an object in said video images; a generating unit arranged to generate a 3D object map based on said identified objects and the detected motion of said objects; and a transmission unit arranged to transmit a said 3D object map to said mobile device.

According to a further aspect of the present invention, there is provided a method of locating a first object using a wireless mobile device comprising a video capturing unit and a display, the method comprising: establishing a video call with a remote server such that said remote server receives video images captured by said mobile device during the video call; performing image recognition to identify at least a second object in said captured video; determining, from a database, the location of said first object with respect to said second objet; and generating a signal for transmission to said mobile device, said signal comprising directions from said second object to said first object.

According to a further aspect of the present invention, there is provided a method of using a wireless mobile device for locating a first object, wherein said mobile device comprises a video capturing unit, the use comprising: using said mobile device to establish a video call between the mobile device and a remote server; pointing said video capturing unit at a second object; receiving by said mobile device, from said remote server, directions from said second object to said first object; and following said directions.

According to a further aspect of the present invention, there is provided a server for providing directions from a second object to a first object comprising: a video calling unit arranged to communicate with a wireless mobile device in a video call and to receive video images captured by said mobile device; an image recognition unit arranged to identify said second object in one or more of said video images; a direction determining unit arranged to determine directions from said second object to said first object; and a transmission unit arranged to transmit a said directions to said mobile device.

Advantageous embodiments of the present invention are recited in the dependent claims of this application.

BRIEF DESCRIPTION OF THE DRAWINGS

FIG. 1 schematically illustrates a data access system according to a first embodiment of the present invention;

FIG. 2 illustrates the display of the mobile device of FIG. 1 in more detail;

DETAILED DESCRIPTION OF THE EMBODIMENTS OF THE PRESENT INVENTION

Figure 3:
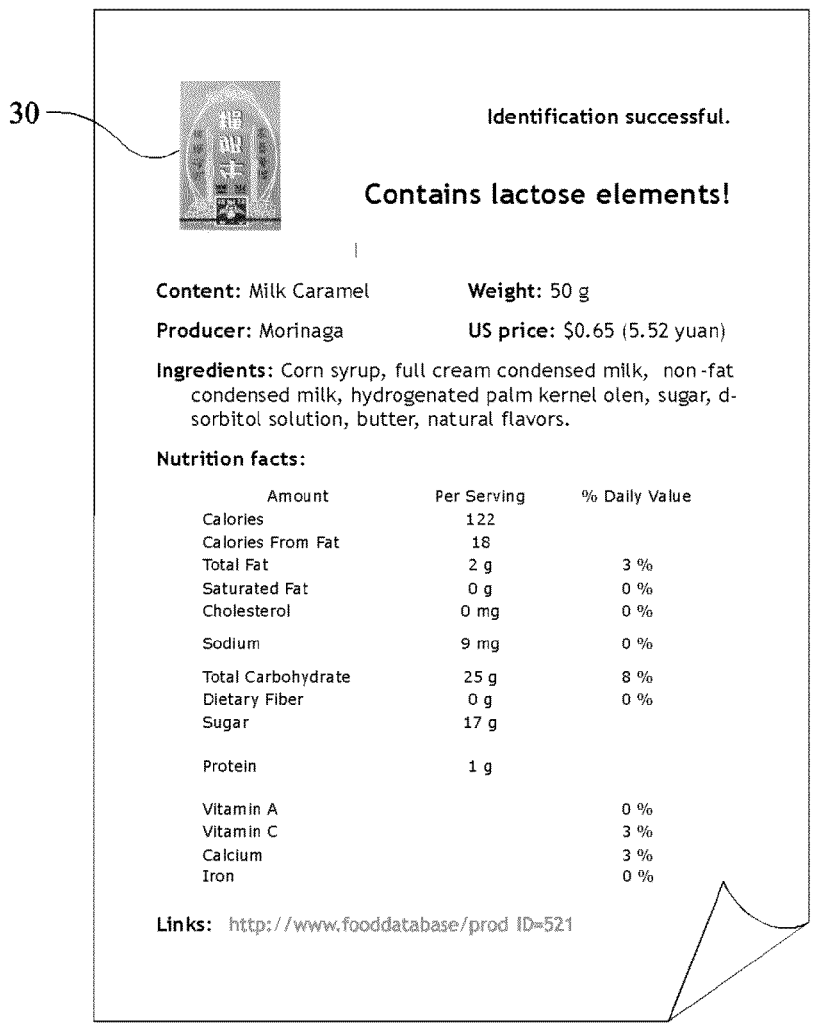
FIG. 3 illustrates an example of a data record retrieved from the Internet relating to a particular product.

FIG. 1 illustrates an information access system. The system comprises a mobile device 1, which is a device having video call capabilities. For example, mobile device 1 is a 3G (third generation) standard mobile telephone, allowing video calls to be established with third parties. Alternatively, mobile device 1 could be a PDA (personal digital organiser), laptop, portable games console or the like, that can capture video, and wirelessly transmit and receive video streams.

Mobile device 1 comprises a key pad 2, allowing data to be entered or the device to be controlled, and a display 3, which is for example an LCD (liquid crystal display). Mobile device 1 also comprises a camera, not shown in FIG. 1, allowing digital video images to be captured, and preferably also comprises a microphone for capturing sound. Modern mobile telephones are generally equipped with such cameras, mounted somewhere on the device, and allowing a user to capture video at the same time as viewing the video being captured on a display.

According to this embodiment, it is desired to use mobile device 1 to obtain information relating to an object 4, which is for example a product in a store.

In a first step, a user starts by initiating a video call, and points the camera of mobile unit 1 at the object 4. Object 4 is thus recorded using the video capabilities of the mobile device 1. Product 4 includes a patterned exterior surface 5, identifying that product. For example, if object 4 is a book, the exterior surface 5 would be the book cover and generally includes the book title, the name of the author, and often a distinctive image or design. Alternatively, if object 4 is a product in a supermarket, the exterior surface 5 would be the packaging and generally includes a brand name, distinctive colors/patterns, and/or a product name.

For the purposes of the present example, it will be assumed that object 4 is a product in a supermarket in China that a western tourist wishes to identify.

The video call is established with a remote image recognition server 6. For example, the user has been provided with a particular dial-up number for use in establishing a video call with server 6. Alternatively, the establishment of such a video call could be performed automatically by the mobile device 1, initiated for example by user selection of a particular icon on the display 3, the necessary connection parameters being pre-programmed in the mobile device 1. The image recognition server is for example a PC, laptop, or other processor.

The mobile device 1 for example establishes the call via a mobile communications network, comprising a number of transmitting and receiving masts 8, connected to communication hardware 10. For example, the mobile communication network could be a UMTS (universal mobile telephony system) network such as a UTRAN system (UMTS terrestrial radio access network) according to the 3G standard. Alternatively, the store in which the user is currently located could have an internal WLAN (wireless local area network), which the mobile device 1 could have access to. In such a case, mast 8 would be a WLAN antenna, and the communication hardware 10 a WLAN server. As a further example, the mobile device 1 may have WiFi (wireless fidelity) capabilities, mast 8 and communication hardware 10 in this case being a WiFi antenna and a server or PC, respectively.

The communications hardware 10 is coupled to the image recognition server 6. As shown in FIG. 1, in some embodiments the communication hardware 10 is connected to image recognition server 6 via the Internet 12. However, in alternative embodiments, the communication hardware 10 is connected directly to the image recognition server 6, for example in the case that the information access system of FIG. 1 is provided entirely within the store in which the user is now present. Alternatively, communication hardware 10 could be connected to image recognition server 6 by an ISDN (Integrated Services Digital Network). Some mobile telephone service providers allow a video call to be routed to a particular line in an ISDN network.

Image recognition server 6 receives the video stream from mobile device 1, and performs image recognition on the image. Image recognition techniques are known in the art and generally comprise real-time visual recognition software that determines the identity of objects in one or a series of images. The real-time visual recognition software of the image recognition server 6 receives and decodes the video call data, identifies any known objects in view, and preferably calculates the position of the objects relative to the camera of the mobile device 1, the reason for which will be described in more detail below.

By calculating the position of the objects relative to the camera of the mobile device 1, information and markers can be overlaid selectively on the camera images by the image recognition server 6 and returned to the display 3 of the mobile device 1. This effectively augments the object with virtual indicators. An example of this is adding a blinking or colored arrow that indicates the location of a specific feature such as the printed expiration date on an object 4. It also allows the entire object 4 to be virtually repackaged in the display 3 based on the user preferences. For example, the display 3 could show a packaging as if designed by the user's dietician that emphasizes the positive or negative effects of a specific product.

Methods for performing this type of image recognition are for example discussed in more detail in the publication "Robust Object Recognition with Cortex-Like Mechanisms" (IEEE Transactions on Pattern Analysis and Machine Intelligence, Vol. 29, No. 3, March 2007, by T. Serre, L. Wolf, S. Bileschi, M. Riesenhuber, and T. Poggio), which is hereby incorporated by reference to the extent allowable by the law.

The object is for example identified based on the pattern on one surface of the object. For example, in the present example, the top surface of the object 4, and in particular region 14 of the top surface of the object 4, is known to the image recognition server 6. The region 14 is for example known from an object database 15. Object database 15 is coupled to the image recognition server 6, and contains visual signatures of objects. One or more signatures and images may be stored for each object. Signatures are unique patterns that are present in an image of the device that uniquely identify the device. If the objects have a principle surface, for example the front cover of a book, or the front cover of a DVD, then the object database 15 for example stores only images or signatures of this surface. However, some objects may be distinctive from a number of different sides, and in this case, images or signatures of each of the sides of the object could be stored in database 15. The object database 15 may be internal or external to the server 6.

In some embodiments, object signatures could be stored locally in the object database 15, and further visual data relating to the objects could be retrieved from the Internet 12. The Internet provides an enormous source of images, in particular images of products. Thus, via the Internet 12, a remote database 16 could be accessed, which contains images of the products in question and these images could for example be used to confirm an image, or update the database with images of new devices.

Associated with the object image in database 15, or accessible from remote database 16, further information is provided relating to objects. For example, for product items that are food products, the product name, pricing information, ingredients, and/or other data may be available. In some cases, the object database 15 contains a reference to a source on the Internet where the further data on the object can be retrieved. Image recognition server 6 responds to the mobile device 1 by transmitting a signal (either a video stream or any signal compatible with a video call), providing at least some of this information. For example, the response could be in the form of a voice message transmitted in the video call, indicating information about the object. In alternative embodiments, the signal is video with or without sound, and the signal could comprise the video stream received from the mobile device 1, with a message superimposed on the screen indicating the product identity and/or other product information. An example is shown in FIG. 2.

FIG. 2 illustrates the display portion of mobile device 1, and in particular an example of product data being displayed on the display 3 during a video call. Display 3 in this example displays a main portion 20 in which the video stream received from the image recognition server 6 is displayed. A small rectangle 22 in the corner of display 3 displays the current image being captured by the mobile device 1. As illustrated, the return video provided by the image recognition server 6 and displayed in region 20 comprises the text: "product identified: milk caramel" superimposed over the original video image captured by the mobile device 1. Further text has been superimposed around the edges of display 20, which will be described in more detail herein after.

FIG. 3 illustrates an example of a data record relating to an object that may be available on the Internet, or stored in the object database 15. The record includes an image taken from the object, labelled 30, which can be used as the basis for image recognition. Image recognition techniques are sufficiently advanced to enable recognition of the object based on only parts of this image, and even when the image is viewed from angles other than directly in front.

In this example, the information in the data record includes the contents of the product, in this case "milk caramel", which is for example transmitted directly to the user in response to a positive identification of the product, as illustrated in FIG. 2. Additional information such as the products weight in grams, the price of the product in certain countries, the ingredients and nutrition facts can also be provided. This information is available to the user as will now be described.

Referring again to FIG. 2, as described above, in one embodiment the image recognition server also superimposes onto the video stream transmitted to the mobile device and displayed on display 3 headings indicating the further information available for that product. As shown in FIG. 2, in this example, four headings are provided: "price" at the bottom of the screen; "weight" at the top of the screen; "nutrition" on the left of the screen; and "ingredients" on the right of the screen. Depending on the available information, different headings can be provided, and/or a greater or less number of headings could be provided. This information can be retrieved by the user by moving or turning the mobile device 1 in the direction that the title is presented on the display 20.

Figure 4:
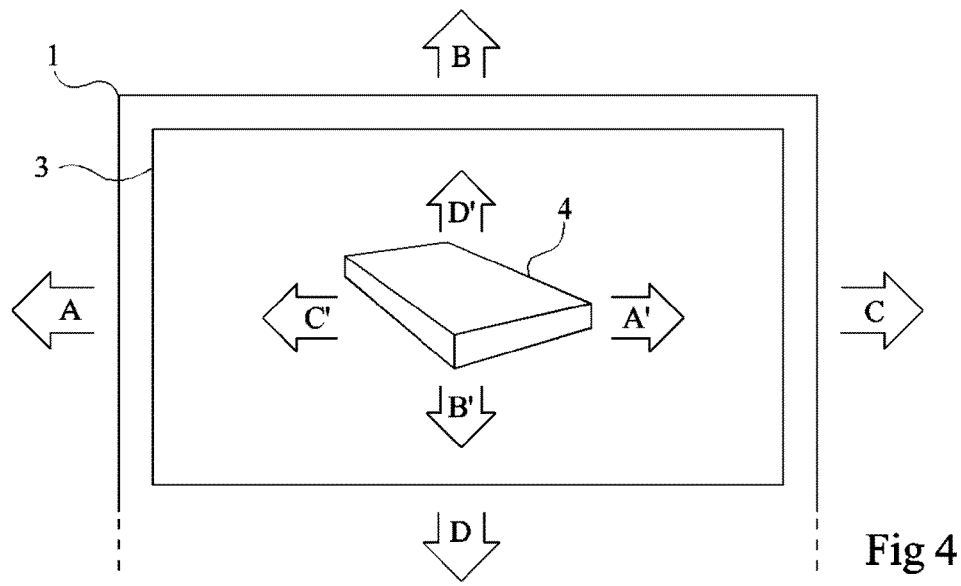
FIG. 4 schematically illustrates a method of selecting data to be retrieved according to embodiments of the present invention.

FIG. 4 illustrates the display portion of the mobile device 1, and shows the effect of moving or turning it. In particular, moving or turning the mobile device 1 to the left, upwards, to the right or downwards, as indicated by arrows A, B, C and D respectively, causes an optical flow in the image captured by the camera of the mobile device, to the right, downwards, to the left or upwards respectively. This optical flow in each direction is illustrated by arrows A', B', C' and D' respectively in FIG. 4. For example, a movement of the mobile device in the direction of arrow A, to the left, will result in a movement of all objects in the display 3 to the right, in a direction A'.

The movement of object 4 in any direction can be detected by the image recognition server 6. Techniques for detecting the movement of a camera from a series of video images are known in the art. For example, the publication titled "Real-time Simultaneous Localization and Mapping with a Single Camera" (Proceedings on the 9$^{th}$ International Conference on Computer Vision, Nice, 2003, A. J. Davison), which is hereby incorporated by reference to the extent allowable by the law, describes such a technique. Furthermore, paper titled "Camera Phone Based Motion Sensing Interactive techniques, Applications and Performance Study" (In ACM UIST 2006, Montreux, Switzerland, October 2006, J. Wang, S. Zhai and J. Canny), which is hereby incorporated to the extent allowable by the law, also describes such techniques.

By detecting the direction of the object movement, the image recognition server 6 responds by providing the corresponding information. Again, this information can be superimposed over the image of the object as captured by the mobile device 1.

Figure 5:
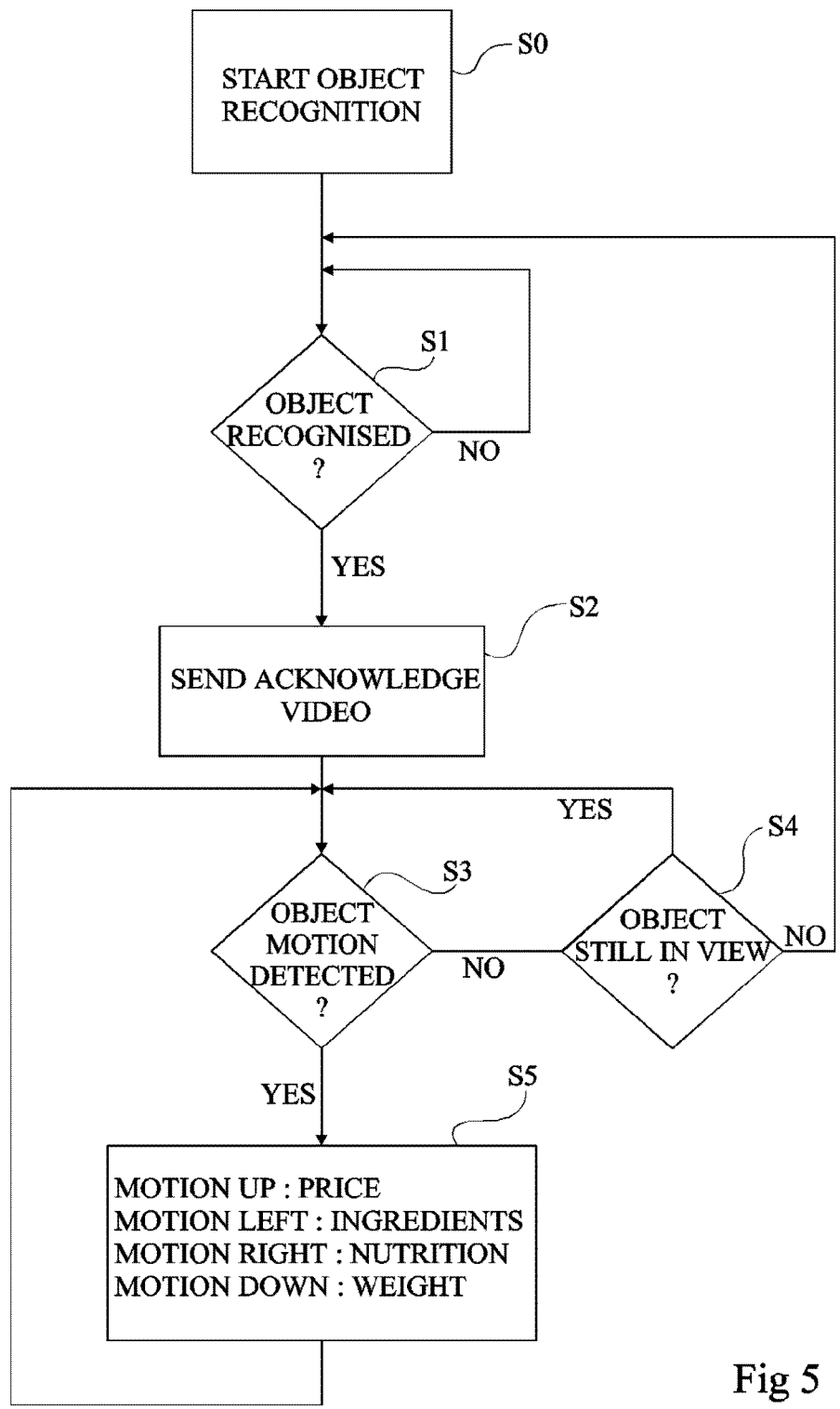
FIG. 5 is a flowchart illustrating successive steps in the method for selecting information according to the present invention.

FIG. 5 is a flow diagram illustrating steps performed by the image recognition server 6.

In a first step S0, image recognition is started, which can for example be triggered by the reception by object server 6 of a request to start a video call, and reception of the a video stream originating from a registered mobile device 1. The image recognition server preferably identifies the particular mobile device 1 making the call by the calling phone number, and configures itself according to the user's authorization level and preference settings such as language settings, alert triggers and logging options. When image recognition begins, the image recognition server may for example transmit a video stream to mobile device 1 having the text "scanning for object" superimposed over the video image received from the mobile device 1, or could transmit a more personalized message.

In a next step S1, the image recognition server 6 determines whether an object within the video stream has been identified. Firstly, it extracts image feature points from the image in real-time and identifies known objects in the image by matching extracted feature points against object features in the object database 15. If no object has been identified, then step S1 is repeated. There is for example a small delay after each test for image recognition, such that until an object is identified, image recognition is repeated at intervals of for example 100 ms, for example corresponding to the time delay between successive frames in the video stream. If an object is identified, this object becomes the active object, and the next step is S2.

In some cases, there may be more than one object within the video stream that is identified. In this case, the method proceeds for example on the basis that the object closest to the center of the video images is the object the user wishes to know about. This image then becomes the active object.

In step S2, the image recognition server 6 transmits a return video stream in which the product identification is provided, for example superimposed over the image of product, and options are provided on the display for further information that may be provided to the user based on user motions, as illustrated in FIG. 2. As explained above, this information may be obtained from the database of objects 15, or a remote database 16 accessible for example via the Internet.

In a next step S3, it is determined whether object motion is detected. This is performed by calculating the optical flow of feature points with respect to previous incoming images. These motions can then be matched against motion templates to detect whether motion is towards the left, the right, up or down.

If no object motion is detected, the next step is S4. In step S4, it is detected whether the object is still in view. If the object is no longer in view, this may indicate that the user no longer wishes to receive information on the active object, or that the active object was not the object that the user wished to be identified. In this case, the next step is S1, in which the image recognition server searches for another object. However, if the object is still in view, the next step is to repeat S3.

If motion is detected in step S3, the next step is S5. In step S5, depending on the motion of the object within the video capture area, different information is transmitted to the mobile device. This information is for example transmitted as a video stream, and may or may not be superimposed over an image of the object. Once this information has been transmitted, we return to step S3, to detect further motion of the object.

According to some embodiments, re-centering the object in the center of the display screen is not detected as a motion and thus no further information is provided, as this can provide a means of resetting the system before further object motion is detected.

According to other embodiments, if no object is currently detected in the camera image, content relating to the last detected object can be displayed and motions can be tracked using standard optical flow algorithms for the whole image instead of object motion tracking.

The image recognition process can be stopped at any time by the user by ending the video call.

Figure 6:
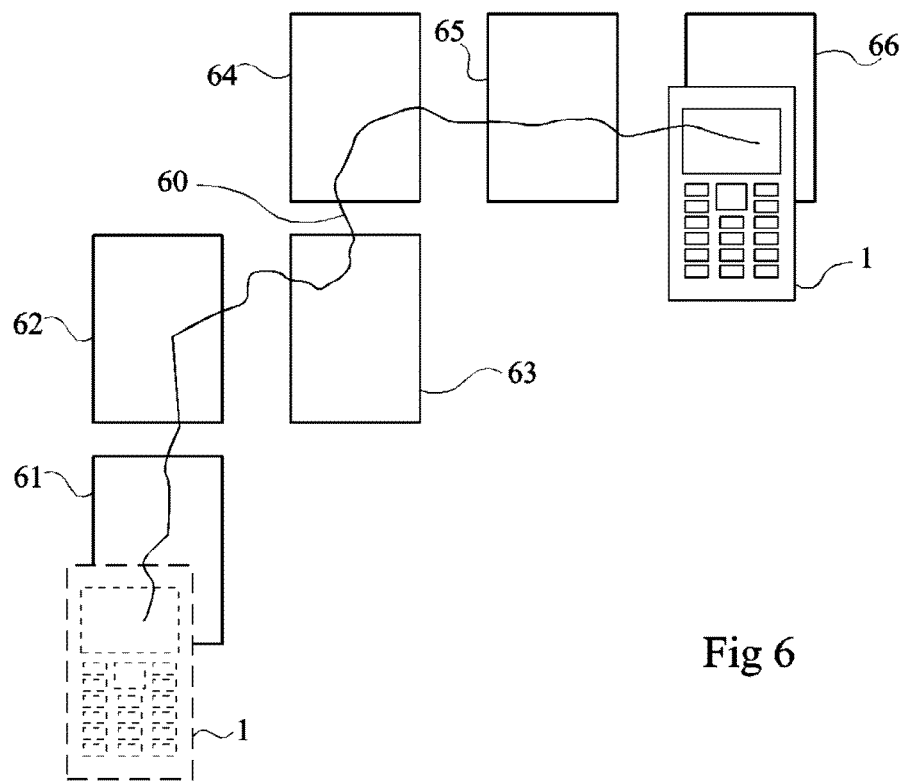
FIG. 6 illustrates schematically a method of building an object map, and compiling a movement part according to an embodiment of the present invention.

FIG. 6 illustrates a method of building a 3D-object map and recording a movement path of the mobile device 1. The 3D object map is for example stored as a 3D image file, and contains references to identified objects, and their 3D positioning with respect to each other. In this embodiment, the mobile device 1 is moved such that its camera captures a series of objects. As with the previous embodiments, a user establishes, using the mobile device 1, a video call with an image recognition server which is able to identify objects captured by the video camera of the mobile device 1. In this example, the mobile device 1 follows a path 60 such that its video camera captures images of a series of objects 61 to 66. As each object passes through the view of the video camera of the mobile device 1, it is identified by the image recognition server 6, for example using the object database 15 or the remote database 16 illustrated in FIG. 1.

By detecting the movements of each object across the video window of the mobile device 1, the image recognition server is able to produce a 3D-object map of the objects within a 3D space. Additionally, the image recognition server is able to determine the path followed by the mobile device 1.

In one embodiment, the embodiment of FIG. 6 is used for generating an image of a scene from the captured images. For example, before refurbishing an apartment, cards having recognizable symbols printed on them could be placed in positions where furniture is to go. When these symbols have been identified by the image recognition server, and the 3D-object map created, the symbols can be replaced by the server with images of the furniture they represent to give an idea of what the furniture would look like in position. As a full 3-D object map is built and tracked on the server, portions of furniture can be displayed correctly in the display screen even if no symbols are currently in the camera view as the map indicates their presence outside the current camera view core.

Figure 7:
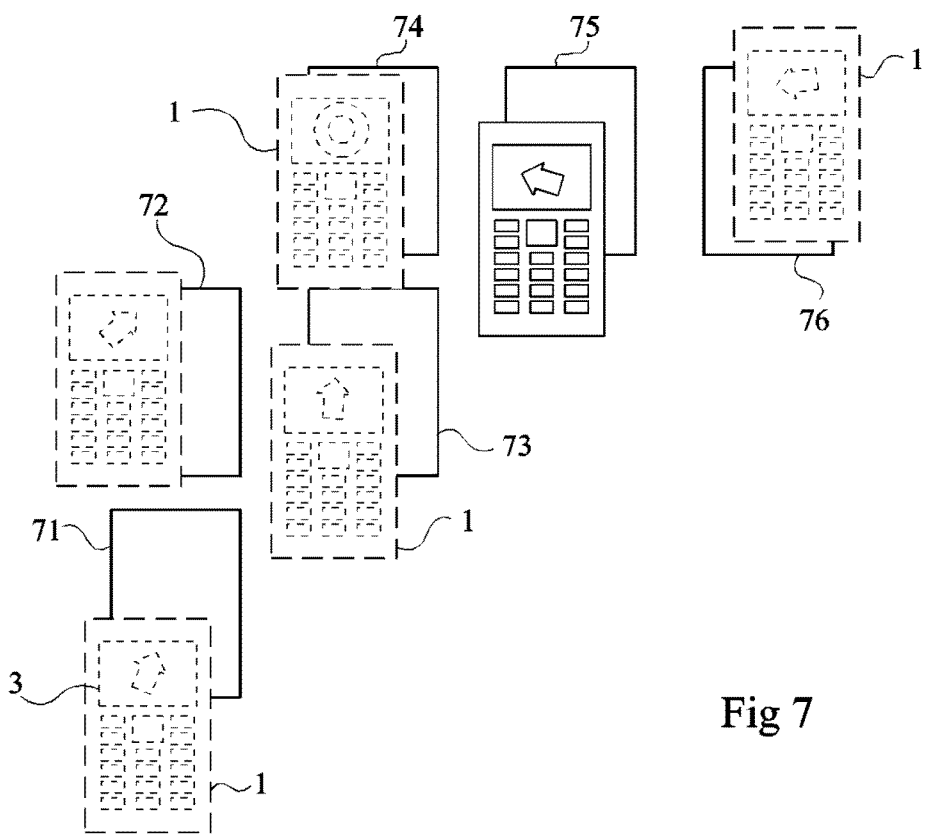
FIG. 7 illustrates a method of finding a particular object according to an embodiment of the present invention.

FIG. 7 illustrates a method of tracking a particular object using the same system of FIG. 1, wherein the spatial relationship of the objects in a certain area is known to the system. For example, upon entering a large storage room, a technician may wish to locate a particular item. As a first step, the technician starts a video call with the image recognition server 6, and indicates the particular item that he wishes to locate. This may be by typing the name of the item, or the manufacturer, which can be transmitted to the image recognition server 6, or by speaking into the mobile device 1 the name or title of the item, such that by speech recognition the image recognition server 6 can determine which item the technician wishes to locate.

The user then points the camera of the mobile device 1 to record video of objects in the storage room, the video being transmitted to the image recognition server 6. Upon recognizing an object in the video images, the image recognition server 6 responds by transmitting a video stream back to the mobile device having an arrow indicating the direction in which the required object can be found. Thus, as is viewed in FIG. 7, when a first object 71 is captured by the video camera of the mobile device 1, an arrow is transmitted to display 3 pointing the user in the direction of the requested object.

The image recognition server preferably knows the particular orientation of the display 3 of the mobile device 1 and its camera, such that the arrow is correctly calibrated.

In the path to the required object, the mobile device can pass over numerous of other objects, which are each identified by the image recognition server 6, and by knowing their location with respect to the location of the requested object, similar directions can be provided to the display 3 of the mobile device 1. The server can also update its location map using this process. When the requested object is found, this can be indicated to the user via the display.

Thus, a method and system has been described in which a user can identify an object viewed by a mobile device having video calling capabilities, and is able to control further information provided relating to the object by movements of the mobile device. Rather than performing image recognition on the device itself, a video link is maintained with a server with performs recognition, provides real-time content, and keeps a record of all interactive sessions. Furthermore, an image recognition server identifies objects and provides an identification of an object to the mobile device in the form of a return video stream, and is also able to provide further information on the object based on motion detected of the object.

The image recognition server stores all incoming video sequences and can thereby be used as a centralized storage system. User accessible logs are provided of all interactions including a structured list of all detected items and the times of their detection. These logs can serve as an automated inventory system. Logs can be re-generated after additional items have been placed in the image database, allowing queries of items to be performed on all previously recorded video sequences, effectively extending the capabilities of the sensor even after the sensing session has taken place.

Advantageously, a user can retrieve information on an object quickly and easily, using a device such as a 3G mobile phone. Thus a user entering a book store is able to quickly access information on a particular book, for example information available on the Internet. Furthermore, a tourist in a foreign country is able to identify products having packaging in a foreign language, and can retrieve further information such as ingredients or price information, without the difficulty of navigating the Internet using a key pad.

The method of selecting the required information is touchless, in other words the user need not touch keys on the mobile device, but only move the device. Furthermore, the entire method of accessing information regarding the object is preferably also completely or nearly completely touch-less, the video call for example being established and ended by voice command.

By providing an image recognition server able to detect motion of the mobile device, control of further information received about the product is easily achieved by motions of the whole device, rather than using buttons on the device. This could be of particular utility to those with a disability such as arthritis who might find operating a keypad difficult.

While a number of specific embodiments of the present invention have been described above with reference to the figures, it will be apparent to those skilled in the art that there are numerous modifications and alterations that can be applied.

For example, whilst particular applications of the invention have been described, there are alternative applications of the invention that would be apparent to those skilled in the art.

While certain types of motions have been described for controlling the information received from the image recognition server, different motions could be recognized, for example forward or back motions of the device, clockwise or counter-clockwise rotation of the mobile device or motions in diagonal directs, for example up and to the left. Furthermore, the information that may be accessible could be any information, and could include voice recordings, further images or videos.

It will be understood that the video of the video call transmitted from the mobile device to the image recognition server and from the image recognition server back to the mobile device can comprise not only images but also sound.

The invention claimed is:

1. A method of accessing information using a mobile device, the method comprising:
   receiving by a remote server video images captured by said mobile device;
   identifying a first object in said captured video images;
   detecting by a motion detection unit a direction of movement of said first object in said video images; and
   generating a signal for transmission to said mobile device, said signal comprising information relating to said first object, wherein the information is selected based on said first object and said detected direction of movement of said first object.

2. The method of claim 1, further comprising selecting said information based on the detected direction of movement of said first object in said video images.

3. The method of claim 1, wherein identifying an object comprises accessing an object database comprising a plurality of object signatures and/or images and matching features of said video images with said plurality of object signatures and/or images.

4. The method of claim 1, wherein said information includes information retrieved from the Internet.

5. The method of claim 1, further comprising:
   receiving an identity of a second object before generating said signal, said remote server knowing a spatial location of said second object with respect to said first object, wherein said information in said signal comprises directions from said first object to said second object.

6. A method of accessing information relating to an object in a video image, the method comprising:
   receiving, by a server, video captured from a video call with a mobile device;
   determining a direction of movement of an object in a field of view of the video; and
   selecting, based upon the determined direction of movement, predetermined information relating to the object.

7. A system for accessing information comprising:
   a mobile device comprising a video capturing unit to capture video images; and
   a server to communicate with said mobile device in a video call, said server comprising:
      an image recognition unit to identify an object in at least one video image captured during said video call;
      a motion detection unit arranged to detect a direction of movement of the object in said at least one video image; and
      a transmission unit to transmit a signal to said mobile device, the signal comprising object information based upon said object and said detected direction of movement.

8. The system of claim 7, further comprising:
   an object database accessible by said server, said object database containing object images,
   wherein to identify the object, the server is to access said object database.

9. The system of claim 7, further comprising a wireless communication network to allow communication between said mobile device and said server.

10. The system of claim 9, wherein said server is connected to said wireless communications network by the Internet.

11. The system of claim 9, wherein said server is connected to said wireless communications network by a switched network.

12. An automatic information supply system comprising:
- a communication unit to communicate with a mobile device in a video call and to receive video images captured by said mobile device;
- an image recognition unit to identify an object in one or more of said video images;
- a motion detection unit to detect a direction of movement of the object in said video images; and
- a transmission unit to transmit a signal to said mobile device, said signal comprising object information based upon said object and said detected direction of movement.

13. The automatic information supply system of claim 12, further comprising an object database comprising a plurality of stored object signatures and/or images.

14. The automatic information supply system of claim 13, wherein the object database further comprises at least one of said object information and a link to a remote database for said object information.

15. A method of building a 3D object map using a mobile device, the method comprising:
- receiving by a server video images captured by said mobile device during a video call;
- identifying a plurality of objects in said captured video images;
- performing motion detection of said identified objects; and
- generating said 3D object map based on said identified objects and storing said 3D object map in a memory, wherein at least one of the plurality of identified objects includes an image of a printed symbol, and wherein generating said 3D object map further comprises replacing, in said object map, the image of the printed symbol with an image of an object represented by the printed symbol.

16. The method of claim 15, wherein said 3D object map comprises references to said plurality of identified objects and their respective 3D positioning.

17. The method of claim 15, further comprising transmitting said 3D object map from said memory to said mobile device.

18. The method of claim 15, further comprising determining a path followed by said mobile device during said video call.

19. A method of generating a 3D object map comprising:
- establishing a video call with a remote server;
- pointing a mobile device at a series of objects and capturing video images of said objects in said video call, at least one said objects comprising a printed symbol;
- transmitting the captured video images to the remote server; and
- receiving a 3D object map of said objects from said remote server, wherein said 3D object map comprises images of said objects, said images including an image of an object represented by the printed symbol in place of the image of the printed symbol.

20. A server for generating a 3D object map comprising:
- a video calling unit to communicate with a mobile device in a video call and to receive video images captured by said mobile device;
- an image recognition unit to identify an object in one or more of said video images;
- a motion detection unit to detect a motion of the object in said video images;
- a generating unit to generate a 3D object map based on said identified objects and the detected motion of said objects, wherein said objects include at least one printed symbol, wherein the generating unit is to:
- replace, in the 3D object map, the image of the printed symbol with an image of an object represented by the printed symbol; and
- a transmission unit to transmit said 3D object map to said mobile device.

21. A method of locating a first object using a mobile device, the method comprising:
- receiving at a remote server video images captured by said mobile device;
- identifying, by the remote server, a second object in said captured video images;
- determining a location of said first object with respect to a location of said second object; and
- generating a video signal for transmission from said remote server to said mobile device, said video signal comprising directions from said second object to said first object.

22. The method of claim 21, wherein said directions comprise voice directions.

23. The method of claim 21, further comprising:
- identifying one of additional objects in said captured video as said first object; and
- generating another signal for transmission to said mobile device, said another signal comprising an indication that the first object has now been located.

24. The method of claim 21, further comprising:
- identifying additional objects in said captured video;
- determining that one of said additional objects is not identified as said first object; and
- generating another signal for transmission to said mobile device, said another signal comprising directions from said additional object to said first object.

25. The method of claim 21, further comprising determining, by the server, an orientation of a display of said mobile device, and wherein generating said signal for transmission to said mobile device comprises generating visual directions to be displayed on the display of said mobile device based on said determined orientation.

26. The method of claim 25, wherein the orientation of the display is determined based on said captured video images.

27. A method of locating a first object using a mobile device comprising:
- establishing a video call between the mobile device and a remote server;
- pointing a video capturing unit of the mobile device at a second object; and
- receiving by said mobile device, from said remote server, a video signal comprising directions from said second object to said first object.

28. A server to provide directions from a second object to a first object, the server comprising:
- a video calling unit to receive video images captured by a mobile device and transmitted to the server;
- an image recognition unit to identify said second object in one or more of said video images;
- a direction determining unit to determine directions from said second object to said first object based upon said video images; and
- a transmission unit to transmit a video signal comprising said directions to said mobile device.

* * * * *